US009054839B2

(12) United States Patent
Chao et al.

(10) Patent No.: US 9,054,839 B2
(45) Date of Patent: Jun. 9, 2015

(54) INTEGRATED MULTI-DATASTREAM TRANSMISSION TECHNOLOGY (75) Inventors: Hua Chao, Shanghai (CN); Ji Li, Shanghai (CN); Yonggang Wang, Shanghai (CN); Zhongji Hu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 108 days.

(21) Appl. No.: 13/576,198

(22) PCT Filed: Dec. 31, 2010

(86) PCT No.: PCT/CN2010/080590
§ 371 (c)(1),
(2), (4) Date: Jul. 31, 2012

(87) PCT Pub. No.: WO2011/095043
PCT Pub. Date: Aug. 11, 2011

(65) Prior Publication Data
US 2012/0300691 A1 Nov. 29, 2012

(30) Foreign Application Priority Data

Feb. 8, 2010 (CN) .......................... 2010 1 0106962

(51) Int. Cl.
*H04L 27/28* (2006.01)
*H04W 4/00* (2009.01)
(Continued)

(52) U.S. Cl.
CPC ............ *H04L 5/0044* (2013.01); *H04L 5/0091* (2013.01); *H04L 27/3488* (2013.01)

(58) Field of Classification Search
USPC .......... 370/312–329, 349–411; 375/265–285, 375/298–320; 455/101–103
See application file for complete search history.

(56) References Cited

U.S. PATENT DOCUMENTS 6,195,396 B1 * 2/2001 Fang et al. .................... 375/261
6,377,632 B1 * 4/2002 Paulraj et al. ................. 375/299
(Continued)

FOREIGN PATENT DOCUMENTS

CN 1973472 5/2007
CN 101213808 A 7/2008
(Continued)

OTHER PUBLICATIONS

International Search Report for PCT/CN2010/080590 dated Mar. 31, 2011.

*Primary Examiner* — Man Phan
(74) *Attorney, Agent, or Firm* — Fay Sharpe LLP (57) ABSTRACT The present invention is related to integrated multi-datastream transmission technology, more particularly, to integrated multi-datastream modulation technology. According to one aspect of the present invention, there is provided a modulation equipment (10), including: a symbol integration means (101), configured to combine a first bit stream with a second bit stream to form a symbol to be modulated; a symbol mapping means (102), configured to map the symbol to be modulated into a QAM modulation symbol according to a set of predetermined mapping rules; wherein, in the set of predetermined mapping rules, multiple constellations corresponding to any first bit stream are located in at least two quadrants in the constellation diagram, while multiple constellations corresponding to any second bit stream are located in at least two quadrants in the constellation diagram. The integrated transmission of a first service data and a second service data (e.g., unicast service data and MBMS data) may be supported and has a better performance than the prior art especially in single cell scenario by using the method, equipment and device in the present invention.

12 Claims, 6 Drawing Sheets

(51) Int. Cl.
  *H04H 20/71* (2008.01)
  *H04L 5/00* (2006.01)
  *H04L 27/34* (2006.01)

(56) References Cited

U.S. PATENT DOCUMENTS

| | | | |
|---|---|---|---|
| 7,093,178 B2* | 8/2006 | Kim et al. | 714/748 |
| 7,164,727 B2* | 1/2007 | Wengerter et al. | 375/267 |
| 7,324,472 B2* | 1/2008 | Dottling et al. | 370/328 |
| 7,920,645 B2* | 4/2011 | Golitschek Edler Von Elbwart et al. | 375/298 |
| 7,961,814 B2* | 6/2011 | Golitschek Edler Von Elbwart et al. | 375/298 |
| 8,005,163 B2* | 8/2011 | Wengerter et al. | 375/298 |
| 8,116,412 B1* | 2/2012 | Jia et al. | 375/343 |
| 8,345,792 B2* | 1/2013 | Kwon et al. | 375/295 |
| 2006/0198454 A1* | 9/2006 | Chung et al. | 375/260 |
| 2008/0025241 A1* | 1/2008 | Bhushan et al. | 370/312 |
| 2008/0267316 A1 | 10/2008 | Golitschek Edler Von Elbwart et al. | |
| 2008/0292017 A1 | 11/2008 | Wetzker et al. | |
| 2009/0042511 A1 | 2/2009 | Malladi | |
| 2009/0052576 A1 | 2/2009 | Golitschek Edler Von Elbwart et al. | |
| 2009/0232252 A1 | 9/2009 | Kim et al. | |
| 2010/0272210 A1 | 10/2010 | Kwon et al. | |

FOREIGN PATENT DOCUMENTS

| | | |
|---|---|---|
| CN | 101213809 A | 7/2008 |
| CN | 101282192 | 10/2008 |
| JP | 3550124 | 4/2004 |
| KR | 20090043201 A | 5/2009 |
| WO | WO2008126047 A1 | 10/2008 |

\* cited by examiner

FIG.1

(Prior Art)

FIG.2

(Prior Art)

INTEGRATED MULTI-DATASTREAM TRANSMISSION TECHNOLOGY

FIELD OF THE INVENTION

The present disclosure relates to wireless communication technology, more particularly, to integrated multi-datastream modulation technology.

BACKGROUND OF THE INVENTION

Hierarchical modulation (HM) technology is used to transmit different data streams together, for example, a first data stream and a second data stream. From the point of view of constellation diagram, hierarchical modulation modulates an upgrade constellation (namely second data stream) on the basis of a primary constellation (namely first data stream).

Figure 1:
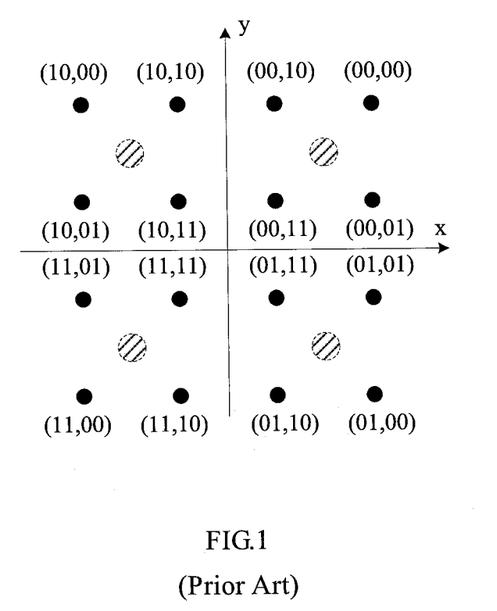
FIG. 1 shows a kind of constellation map of 16QAM hierarchical modulation in prior art.

FIG. 1 shows a kind of constellation map of 16QAM hierarchical modulation in prior art. This constellation map includes 16 constellations as shown by 16 black points. Any modulation symbol, which includes 4 bits, can be mapped into one of the 16 constellations. The front two bits in the modulation symbol correspond to a first data stream, while the last two bits correspond to a second data stream. The constellations corresponding to the modulation symbols of the same first data stream are located in the same quadrant. Such 16QAM hierarchical modulation may be considered as the sum of two QPSK constellations, wherein a first data stream corresponds to a primary QPSK constellation as shown by four diagonal circles, while a second data stream corresponds to an upgrade QPSK constellation as shown by four constellations in each quadrants (relative to the diagonal circle in the quadrant).

Dirty Paper Coding (DPC) modulation technology has a constellation mapping feature similar to hierarchical modulation, constellation map of which may also be consider as the sum of a primary constellation and an upgrade constellation. In the prior art, a technology scheme has been proposed that the data stream of unicast service and the data stream of multimedia broadcast service (MBMS) are transmitted together based on the Dirty Paper Coding modulation technology in the Orthogonal Frequency Division Multiplexing (OFDM) system, wherein, the unicast service data stream corresponds to a first data stream, while the MBMS data stream corresponds to a second data stream. Such technology scheme is based on the following assumption: Multiple base stations work on a single frequency network (SFN) manner for MBMS data stream.

However, there also exists a need for the technology scheme that multiple data streams (e.g., unicast service data stream and MBMS data stream) are transmitted together in case of single cell network environment.

SUMMARY OF THE INVENTION

Figure 2:
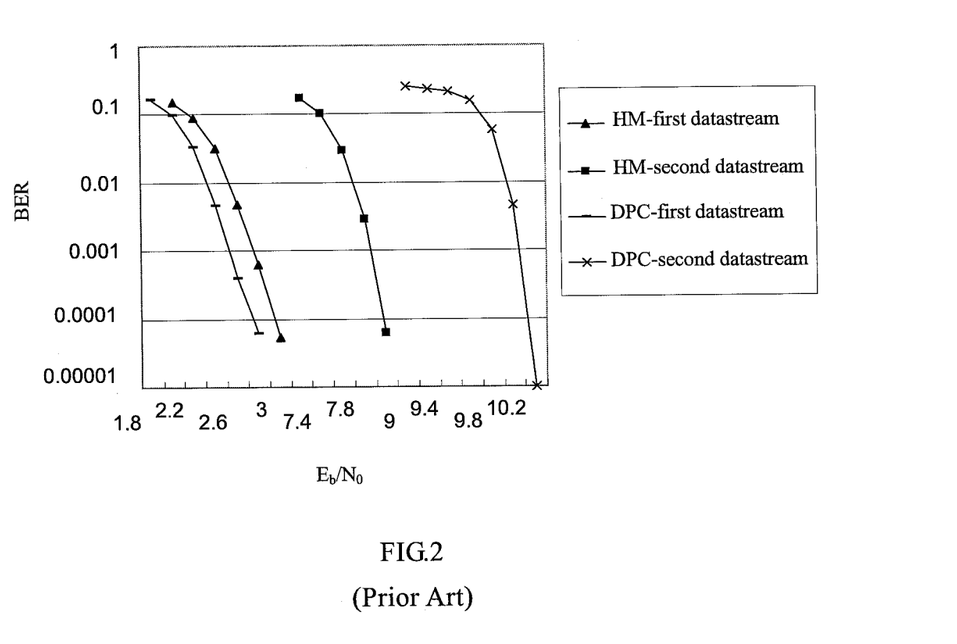
FIG. 2 shows the simulation result of the modulation scheme of the 16QAM hierarchical modulation and 16QAM DPC in the prior art.

FIG. 2 shows the simulation result of the modulation scheme of the 16QAM hierarchical modulation and 16QAM DPC in the prior art. The simulation conditions are as followed: Maximum transmission power of base station (BS) is 43 dBm, Bandwidth is 5 MHz, Subcarrier space is 15 Hz, FFT size is 512, Inter site distance is 500 m, Strength ratio of a first data stream to second data stream is 2, Turbo code with the code rate of ⅓ has been applied for the coding scheme, Two-stage QPSK as shown in FIG. 1 has been applied for the modulation scheme, Log-map algorithm has been applied for the decoding, AWGN has been applied for the channel condition and Ideal channel estimation has been applied for the channel estimation scheme. In FIG. 2 abscissa represents the ratio of the average power $E_b$ of the 16QAM symbols to noise power spectrum density $N_0$, while vertical coordinate represents bit error rate. As shown in the figure, the performance curve with triangle marks is for the first data stream in case of 16QAM hierarchical modulation scheme, the performance curve with quadrel marks is for the second data stream in case of 16QAM hierarchical modulation scheme, the performance curve with strigula marks is for the first data stream in case of 16QAM DPC modulation scheme and the performance curve with cross marks is for the second data stream in case of 16QAM DPC modulation scheme. As shown in FIG. 2, there is an apparent performance difference between the first data stream and the second data stream in case of 16QAM hierarchical modulation scheme and 16QAM DPC modulation scheme. For a second data stream (e.g., MBMS data stream), the received power of the second data stream at user equipment may be compensated due to the sum of the signal from multiple base stations to improve the reception performance of a second data stream when multiple base stations work on a single frequency network manner.

However, the apparent performance difference between a first data stream and a second data stream cannot be overcome by using hierarchical modulation technology or DPC modulation technology in the prior art in single cell network environment. The reception performance of a second data stream may be unbearable so that the integrated multi-datastream transmission loses its desired effects.

Thus there exists a need for a new technology scheme to reduce or eliminate the performance gap for multiple data streams in BER in order to enable multiple data streams to be transmitted integrated in single cell network environment.

According to one aspect of the present invention, there is provided a modulation equipment, comprising: a symbol integration means, configured to combine a first bit stream with a second bit stream to form a symbol to be modulated; a symbol mapping means, configured to map the symbol to be modulated into a QAM modulation symbol according to a set of predetermined mapping rules; wherein, in the set of predetermined mapping rules, multiple constellations corresponding to any first bit stream are located in at least two quadrants in the constellation diagram, while multiple constellations corresponding to any second bit stream are located in at least two quadrants in the constellation diagram.

According to another aspect of the present invention, there is provided a modulation method, wherein, said method comprises steps of: combining a first bit stream with a second bit stream to form a symbol to be modulated; mapping the symbol to be modulated into a QAM modulation symbol according to a set of predetermined mapping rules; wherein, in the set of predetermined mapping rules, multiple constellations corresponding to any first bit stream are located in at least two quadrants in the constellation diagram, while multiple constellations corresponding to any second bit stream are located in at least two quadrants in the constellation diagram.

According to a further aspect of the present invention, there is provided a transmitter for transmitting integrated multi-datastream signal, comprising: a subcarrier mapping equipment, configured to transform first type of service data stream(s) into a first bit stream corresponding to each subcarrier; a Serial/Parallel converter, configured to transform a second type of service data stream into a second bit stream corresponding to each subcarrier; a modulation equipment, configured to combine the first bit stream and the second bit stream corresponding to each subcarrier to form a symbol to be modulated, and to map the symbol to be modulated into a QAM modulation symbol according to a set of predetermined mapping rules; a signal forming equipment, configured to generate OFDM signal according to the QAM symbol in each subcarrier.

According to a still further aspect of the present invention, there is provided a method of transmitting integrated multiple service data in a base station in a wireless communication system, wherein, said method comprises steps of: broadcasting indication information related to an integrated service data, wherein the indication information includes a set of predetermined mapping rules and the integrated service data includes a first type of service data and a second type of service data; transmitting the scheduling information of the first type of service and the signaling of the second type of service; combining a first type of service data and a second type of service data according to the set of predetermined mapping rules, to generate integrated service data; transmitting the integrated service data.

The integrated transmission of a first type of service data and a second type of service data (e.g., unicast service data and MBMS data) may be supported and has a better performance than the prior art especially in single cell network environment by using the method, equipment and device in the present invention.

BRIEF DESCRIPTION OF DRAWINGS

With reference to the following detailed description of the non-restrictive embodiments, other features, objects and advantages of the present invention will be more apparent.

Wherein, throughout different figures, same or similar reference numerals refer to corresponding features.

DETAILED DESCRIPTION OF EMBODIMENTS

Figure 3:
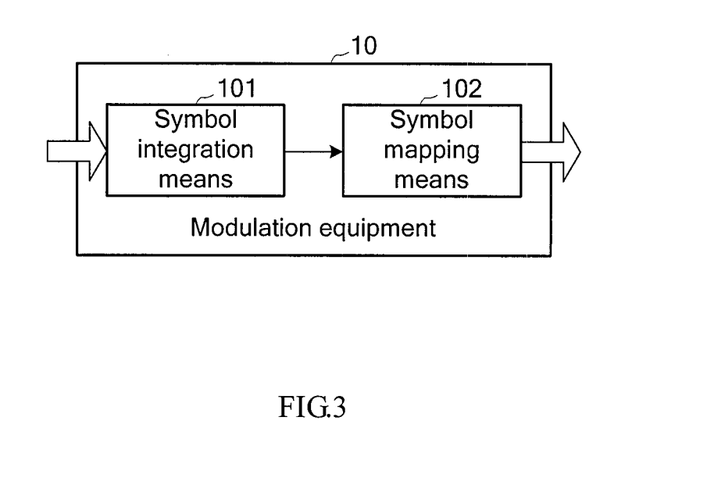
FIG. 3 shows a block diagram of a modulation equipment according to an embodiment of the present invention.

FIG. 3 shows a block diagram of a modulation equipment according to an embodiment of the present invention. As shown, modulation equipment 10 includes symbol integration means 101 and symbol mapping means 102. Modulation equipment 10 is typically set in the transmitter, which transmits integrated multi-datastream signal.

Symbol integration means 101 is configured to combine a first bit stream with a second bit stream to form a symbol to be modulated.

Symbol mapping means 102 is configured to map the symbol to be modulated into a QAM modulation symbol according to a set of predetermined mapping rules.

Wherein, in the set of predetermined mapping rules, multiple constellations corresponding to any first bit stream are located in at least two quadrants in the constellation diagram, while multiple constellations corresponding to any second bit stream are located in at least two quadrants in the constellation diagram.

Figure 4:
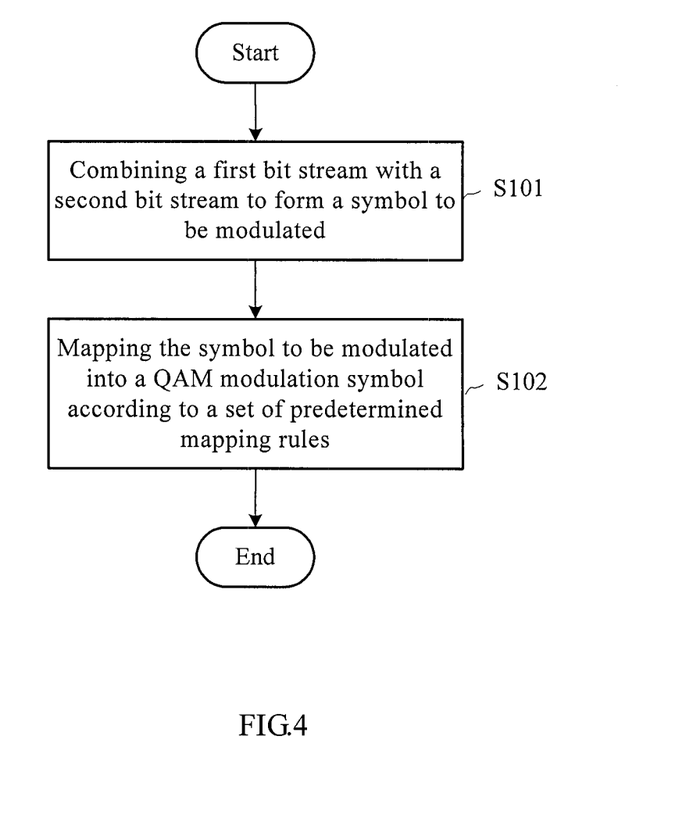
FIG. 4 shows a flowchart of a modulation method according to an embodiment of the present invention.

FIG. 4 shows a flowchart of a modulation method according to an embodiment of the present invention. As shown, the modulation method includes two steps S101 and S102. The modulation method is typically implemented in the transmitter, which transmits integrated multi-datastream signal.

In step S101, a first bit stream and a second bit stream are combined to form a symbol to be modulated.

In step S102, the symbol to be modulated is mapped into a QAM modulation symbol according to a set of predetermined mapping rules.

Wherein, in the set of predetermined mapping rules, multiple constellations corresponding to any first bit stream are located in at least two quadrants in the constellation diagram, while multiple constellations corresponding to any second bit stream are located in at least two quadrants in the constellation diagram.

Modulation equipment 10 shown in FIG. 3 is generally used to execute the modulation method shown in FIG. 4. Symbol integration means 101 is used to execute step S101 and symbol mapping means 102 is used to execute step S102. The set of predetermined mapping rules are generally stored in the memory of the transmitter (e.g., base station) or the receiver (e.g., user equipment).

According to an embodiment of the present invention, 16QAM is applied for the modulation scheme. One symbol includes four bits information, wherein a first bit stream and a second bit stream occupies two bits respectively.

According to an embodiment of the present invention, 64QAM is applied for the modulation scheme. One symbol includes six bits information, wherein the information ratio may be: a first bit stream occupies four bits and a second bit stream occupies two bits; or both a first bit stream and a second bit stream occupy three bits; or a first bit stream occupies two bits and a second bit stream occupies four bits.

According to other embodiments of the present invention, 32QAM and 128QAM etc. may also be applied for the modulation scheme. The ratio of a first bit stream to a second bit stream in a symbol may also be adjusted according to the demand.

As described above, 16QAM hierarchical modulation in the prior art as shown in FIG. 1 may be considered as the sum of two QPSK constellations. A first data stream corresponds to an primary QPSK constellation as shown by four diagonal circles, while a second data stream corresponds to an upgrade QPSK constellation as shown by four constellations in each quadrants (relative to the diagonal circle in the quadrant). From intuitive point of view, the constellations corresponding to the modulation symbols of the same first data stream are located in the same quadrant, and the constellation distance of the primary QPSK constellation is greater than the constellation distance of the upgrade QPSK constellation. Explained from the point of view of energy, the average energy per bit of a first data stream is higher than the average energy per bit of a second data stream, so that it causes the difference of the reception performance (BER) between a first data stream and a second data stream.

In the set of predetermined mapping rules in the present invention, multiple constellations corresponding to any first bit stream are located in at least two quadrants in the constellation diagram, while multiple constellations corresponding to any second bit stream are located in at least two quadrants in the constellation diagram. A first bit stream and a second bit stream are integrated as an entire to be mapped to the complex plane without the feature of the sum of two low-dimension QAM or QPSK in hierarchical modulation or DPC modulation of the prior art, so that the difference between the average energy per bit of a first data stream and the average energy per bit of a second data stream is reduced or even eliminated. Therefore the difference of the reception performance (BER) between a first data stream and a second data stream may also be reduced or even eliminated.

According to some embodiments of the present invention, in the modulation equipment 10 as shown in FIG. 3, or in the modulation method as shown in FIG. 4, a first bit stream includes unicast service data, while a second bit stream includes MBMS data.

According to some embodiments of the present invention, the modulation equipment 10 as shown in FIG. 3 and the modulation method as shown in FIG. 4 are applied in single cell network environment.

Figure 5A:
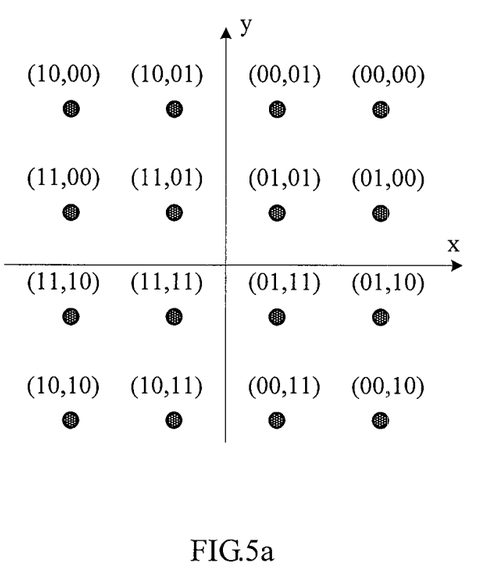
FIGS. 5a, 5b, 5c and 5d respectively shows a 16QAM constellation map according to an respective embodiment of the present invention.

According to an embodiment of the present invention, 16QAM is applied for the modulation scheme and the constellation map corresponding to the set of predetermined mapping rules is shown in FIG. 5a. One symbol includes four bits information, wherein a first bit stream and a second bit stream occupies two bits respectively. A symbol is represented as a bit sequence $b_0b_1b_2b_3$, in this embodiment, a first bit stream corresponds to $b_0b_1$, while a second bit stream corresponds to $b_2b_3$. As shown, four symbols, of which the first bit stream is 10, are symbol 1000, 1001, 1010 and 1011. The corresponding four constellations are respectively located in the second quadrant and the third quadrant in the complex plane and the pattern constructed by these four constellations is a rectangle which is symmetrical relative to the x axis of the complex plane and the long side of which is parallel to the y axis of the complex plane. Similarly, the pattern constructed by the four constellations corresponding to the four symbols, of which the first bit stream is 00, the pattern constructed by the four constellations corresponding to the four symbols, of which the first bit stream is 01 and the pattern constructed by the four constellations corresponding to the four symbols, of which the first bit stream is 11, are also a rectangle. Four symbols, of which the second bit stream is 00, are symbol 1000, 1100, 0000 and 0100. The corresponding four constellations are respectively located in the first quadrant and the second quadrant in the complex plane and the pattern constructed by these four constellations is a rectangle which is symmetrical relative to the y axis of the complex plane and the long side of which is parallel to the x axis of the complex plane. Similarly, the pattern constructed by the four constellations corresponding to the four symbols, of which the second bit stream is 01, the pattern constructed by the four constellations corresponding to the four symbols, of which the second bit stream is 10 and the pattern constructed by the four constellations corresponding to the four symbols, of which the second bit stream is 11, are also a rectangle. In this embodiment, the patterns constructed by the constellations corresponding to the symbols with a same first bit stream constitute a first set of patterns, which includes four rectangles; the patterns constructed by the constellations corresponding to the symbols with a same second bit stream constitute a second set of patterns, which also includes four rectangles; any pattern in the first set of patterns and a corresponding pattern in the second set of patterns are symmetrical relative to line y=x or line y=−x by pairs in the complex plane in the constellation diagram.

Figure 5B:
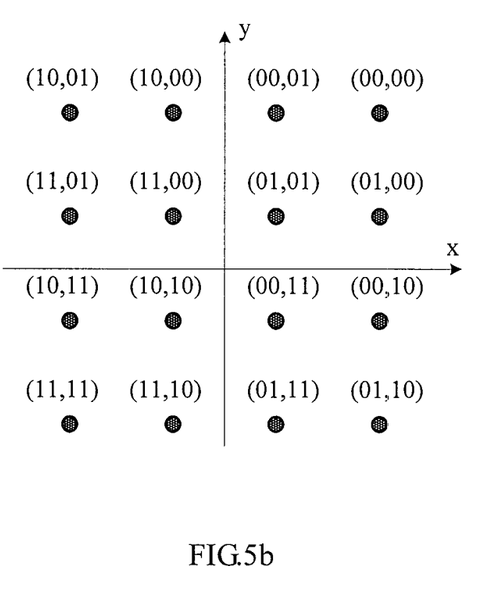

According to another embodiment of the present invention, 16QAM is applied for the modulation scheme and the constellation map corresponding to the set of predetermined mapping rules is shown in FIG. 5b. One symbol includes four bits information, wherein a first bit stream and a second bit stream occupies two bits respectively. A symbol is represented as a bit sequence $b_0b_1b_2b_3$, in this embodiment, a first bit stream corresponds to $b_0b_1$, while a second bit stream corresponds to $b_2b_3$. As shown, four symbols, of which the first bit stream is 10, are symbol 1000, 1001, 1010 and 1011. The corresponding four constellations are respectively located in the second quadrant and the third quadrant in the complex plane and the pattern constructed by these four constellations is a rectangle which is not symmetrical relative to the x axis of the complex plane and the long side of which is parallel to the y axis of the complex plane. Similarly, the pattern constructed by the four constellations corresponding to the four symbols, of which the first bit stream is 00, the pattern constructed by the four constellations corresponding to the four symbols, of which the first bit stream is 01 and the pattern constructed by the four constellations corresponding to the four symbols, of which the first bit stream is 11, are also a rectangle. Four symbols, of which the second bit stream is 00, are symbol 1000, 1100, 0000 and 0100. The corresponding four constellations are respectively located in the first quadrant and the second quadrant in the complex plane and the pattern constructed by these four constellations is a rectangle which is not symmetrical relative to the y axis of the complex plane and the long side of which is parallel to the x axis of the complex plane. Similarly, the pattern constructed by the four constellations corresponding to the four symbols, of which the second bit stream is 01, the pattern constructed by the four constellations corresponding to the four symbols, of which the second bit stream is 10 and the pattern constructed by the four constellations corresponding to the four symbols, of which the second bit stream is 11, are also a rectangle. In this embodiment, the patterns constructed by the constellations corresponding to the symbols with a same first bit stream constitute a first set of patterns, which includes four rectangles; the patterns constructed by the constellations corresponding to the symbols with a same second bit stream constitute a second set of patterns, which also includes four rectangles; any pattern in the first set of patterns and a corresponding pattern in the second set of patterns are symmetrical relative to line y=x or line y=−x by pairs in the complex plane in the constellation diagram.

Figure 5C:
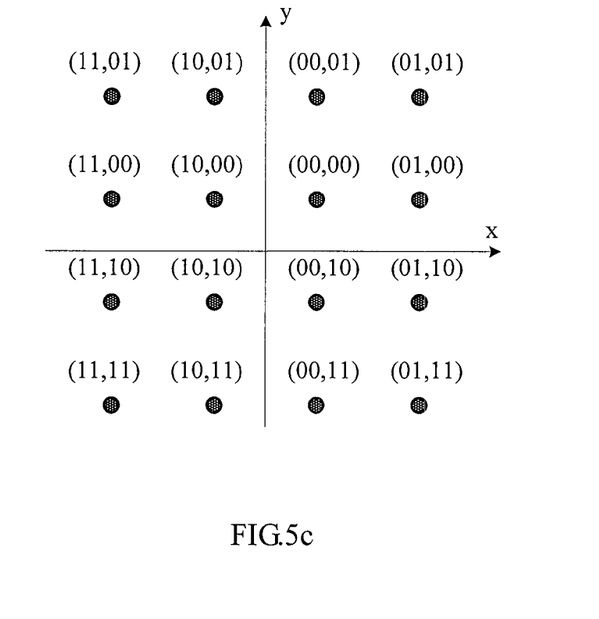

According to a further embodiment of the present invention, 16QAM is applied for the modulation scheme and the constellation map corresponding to the set of predetermined mapping rules is shown in FIG. 5c. One symbol includes four bits information, wherein a first bit stream and a second bit stream occupies two bits respectively. A symbol is represented as a bit sequence $b_0b_1b_2b_3$, in this embodiment, a first bit stream corresponds to $b_0b_1$, while a second bit stream corresponds to $b_2b_3$. As shown, four symbols, of which the first bit stream is 10, are symbol 1000, 1001, 1010 and 1011. The corresponding four constellations are respectively located in the second quadrant and the third quadrant in the complex plane and the pattern constructed by these four constellations is a line parallel to y axis in the complex plane. Similarly, the pattern constructed by the four constellations corresponding to the four symbols, of which the first bit stream is 00, the pattern constructed by the four constellations corresponding to the four symbols, of which the first bit stream is 01 and the pattern constructed by the four constellations corresponding to the four symbols, of which the first bit stream is 11, are also a line parallel to y axis in the complex plane. Four symbols, of which the second bit stream is 00, are symbol 1000, 1100, 0000 and 0100. The corresponding four constellations are respectively located in the first quadrant and the second quadrant in the complex plane and the pattern constructed by these four constellations is a line parallel to x axis in the complex plane. Similarly, the pattern constructed by the four constellations corresponding to the four symbols, of which the second bit stream is 01, the pattern constructed by the four constellations corresponding to the four symbols, of which the second bit stream is 10 and the pattern constructed by the four constellations corresponding to the four symbols, of which the second bit stream is 11, are also a line parallel to x axis in the complex plane. In this embodiment, the patterns constructed by the constellations corresponding to the symbols with a same first bit stream constitute a first set of patterns, which includes four lines parallel to y axis in the complex plane; the patterns constructed by the constellations corresponding to the symbols with a same second bit stream constitute a second set of patterns, which also includes four lines parallel to x axis in the complex plane; any pattern in the first set of patterns and a corresponding pattern in the second set of patterns are symmetrical relative to line y=x or line y=−x by pairs in the complex plane in the constellation diagram.

Figure 5D:
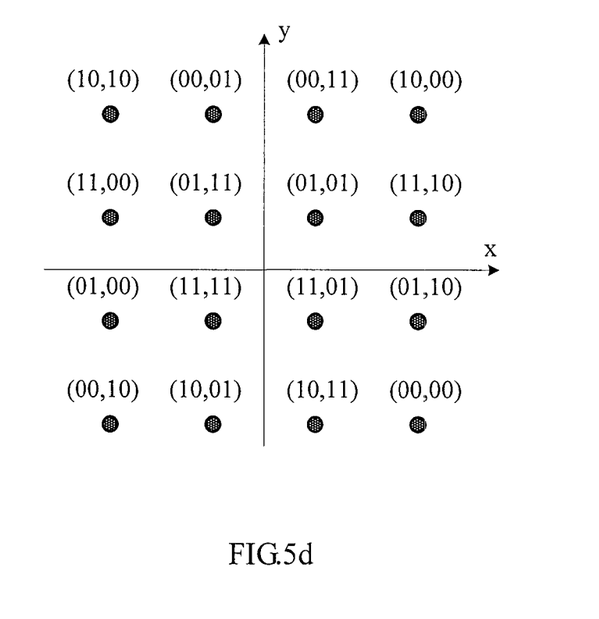

According to an embodiment of the present invention, 16QAM is applied for the modulation scheme and the constellation map corresponding to the set of predetermined mapping rules is shown in FIG. 5d. One symbol includes four bits information, wherein a first bit stream and a second bit stream occupies two bits respectively. A symbol is represented as a bit sequence $b_0b_1b_2b_3$, in this embodiment, a first bit stream corresponds to $b_0b_1$, while a second bit stream corresponds to $b_2b_3$. As shown, four symbols, of which the first bit stream is 10, are symbol 1000, 1001, 1010 and 1011. The corresponding four constellations are respectively located in the four quadrants in the complex plane and the pattern constructed by these four constellations is a trapezoid of which the upper bottom and lower bottom are parallel to x axis in the complex plane. Similarly, the pattern constructed by the four constellations corresponding to the four symbols, of which the first bit stream is 00, the pattern constructed by the four constellations corresponding to the four symbols, of which the first bit stream is 01 and the pattern constructed by the four constellations corresponding to the four symbols, of which the first bit stream is 11, are also a trapezoid. Four symbols, of which the second bit stream is 00, are symbol 1000, 1100, 0000 and 0100. The corresponding four constellations are respectively located in the four quadrants in the complex plane and the pattern constructed by these four constellations is a trapezoid of which the upper bottom and lower bottom are parallel to y axis in the complex plane. Similarly, the pattern constructed by the four constellations corresponding to the four symbols, of which the second bit stream is 01, the pattern constructed by the four constellations corresponding to the four symbols, of which the second bit stream is 10 and the pattern constructed by the four constellations corresponding to the four symbols, of which the second bit stream is 11, are also a trapezoid. In this embodiment, the patterns constructed by the constellations corresponding to the symbols with a same first bit stream constitute a first set of patterns, which includes four trapezoids; the patterns constructed by the constellations corresponding to the symbols with a same second bit stream constitute a second set of patterns, which also includes four trapezoids; any pattern in the first set of patterns and a corresponding pattern in the second set of patterns are symmetrical relative to line y=x or line y=−x by pairs in the complex plane in the constellation diagram.

Above FIGS. 5a, 5b, 5c and 5d have shown 16QAM constellation mapping. The amount of information for a first bit stream is as same as the amount of information for a second bit stream (both two bits). The four predetermined mapping rules as described above all meet the following two conditions: (1) Multiple constellations corresponding to any first bit stream are located in at least two quadrants in the constellation diagram, while multiple constellations corresponding to any second bit stream are located in at least two quadrants in the constellation diagram; (2) the constellation distribution patterns corresponding to a first bit stream and the constellation distribution patterns corresponding to a second bit stream are symmetrical relative to line y=x or line y=−x, wherein, x and y represent the coordinate axis in the complex plane of the constellation diagram. Because both of the two conditions described above have been met at the same time, especially the second condition has been met, there is no relationship of high or low level between a first bit stream and a second bit stream any more, so that the difference between the average energy per bit of a first data stream and a second data stream is reduced or even eliminated. Therefore, the difference of the reception performance (BER) between a first data stream and a second data stream will be also reduced or even eliminated. It is intelligible to those skilled in the art that, various predetermined mapping rules which meet the two conditions described above at the same time may also be designed for the situation in which the amount of information for a first bit stream is as same as the amount of information for a second bit stream, for example, the situation in which a first bit stream and a second bit stream occupies two bits respectively when modulated by 16QAM, or the situation in which a first bit stream and a second bit stream occupies three bits respectively when modulated by 64QAM.

Figure 6:
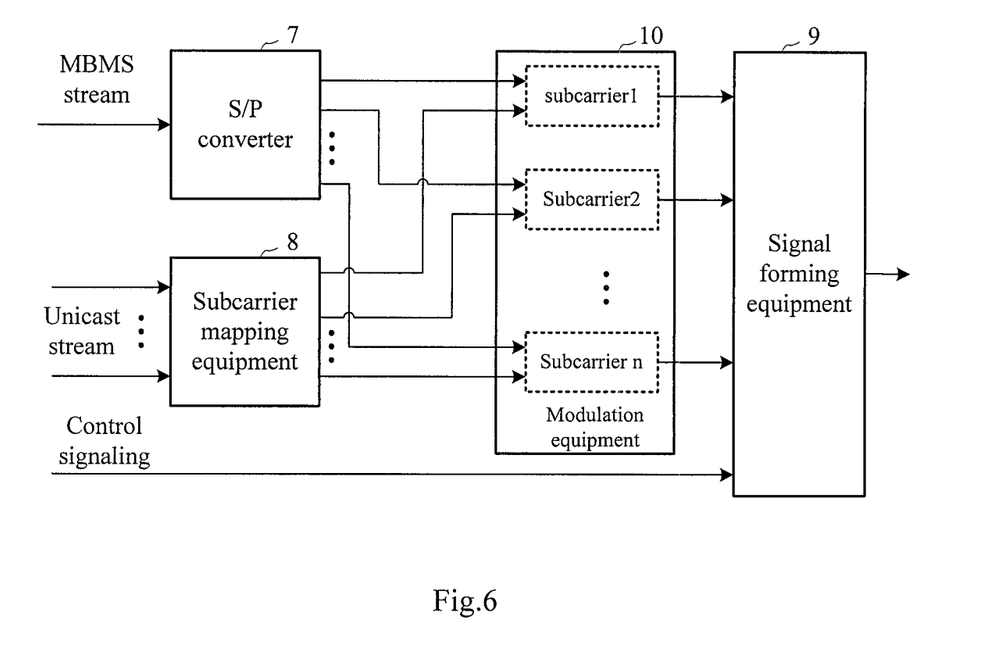
FIG. 6 shows a block diagram of a transmitter for transmitting integrated multi-datastream signal according to an embodiment of the present invention.

FIG. 6 shows a block diagram of a transmitter for transmitting integrated multi-datastream signal according to an embodiment of the present invention. As shown, the transmitter in this embodiment includes: Serial/Parallel converter 7, subcarrier mapping equipment 8, modulation equipment 10 and signal forming equipment 9.

In OFDM system, data signal are carried in frequency band(s). Integrated multi-datastream signal will be carried in the same time-frequency resources. In each frequency band, the total bandwidth is divided into multiple subcarriers which are orthogonal with each other. As shown in FIG. 6, in this embodiment, a first type of service data and a second type of service data, for example, unicast service data and MBMS data, are transmitted in integration. In a certain frequency band, MBMS data stream is transmitted over all the frequency band, and second bit streams corresponding to each subcarrier are generated from MBMS data stream by means of the transformation of S/P converter 7; each unicast service data stream corresponds one or more subcarriers allocated for carrying signal, and first bit streams corresponding to each subcarrier are generated from a number of unicast service data streams by means of the process of subcarrier mapping equipment 8.

For a first bit stream and a second data stream on each subcarrier, symbol integration means 101 in modulation equipment 10 is configured to combine a first bit stream with a second bit stream to form a symbol to be modulated. Symbol mapping means 102 in modulation equipment 10 is configured to map the symbol to be modulated into a QAM modulation symbol according to the set of predetermined mapping rules. Wherein, in the set of predetermined mapping rules, multiple constellations corresponding to any first bit stream are located in at least two quadrants in the constellation diagram, while multiple constellations corresponding to any second bit stream are located in at least two quadrants in the constellation diagram. For example, but not limited to, the set of predetermined mapping rules here corresponds to any constellation map shown in FIGS. 5a, 5b, 5c and 5d. After the process described above, modulation equipment 10 generates QAM symbols on each subcarrier.

Signal forming equipment 9 is configured to combine control signaling with QAM symbols on each subcarrier generated by modulation equipment 10 together so as to generate OFDM signal of this frequency band.

Figure 7:
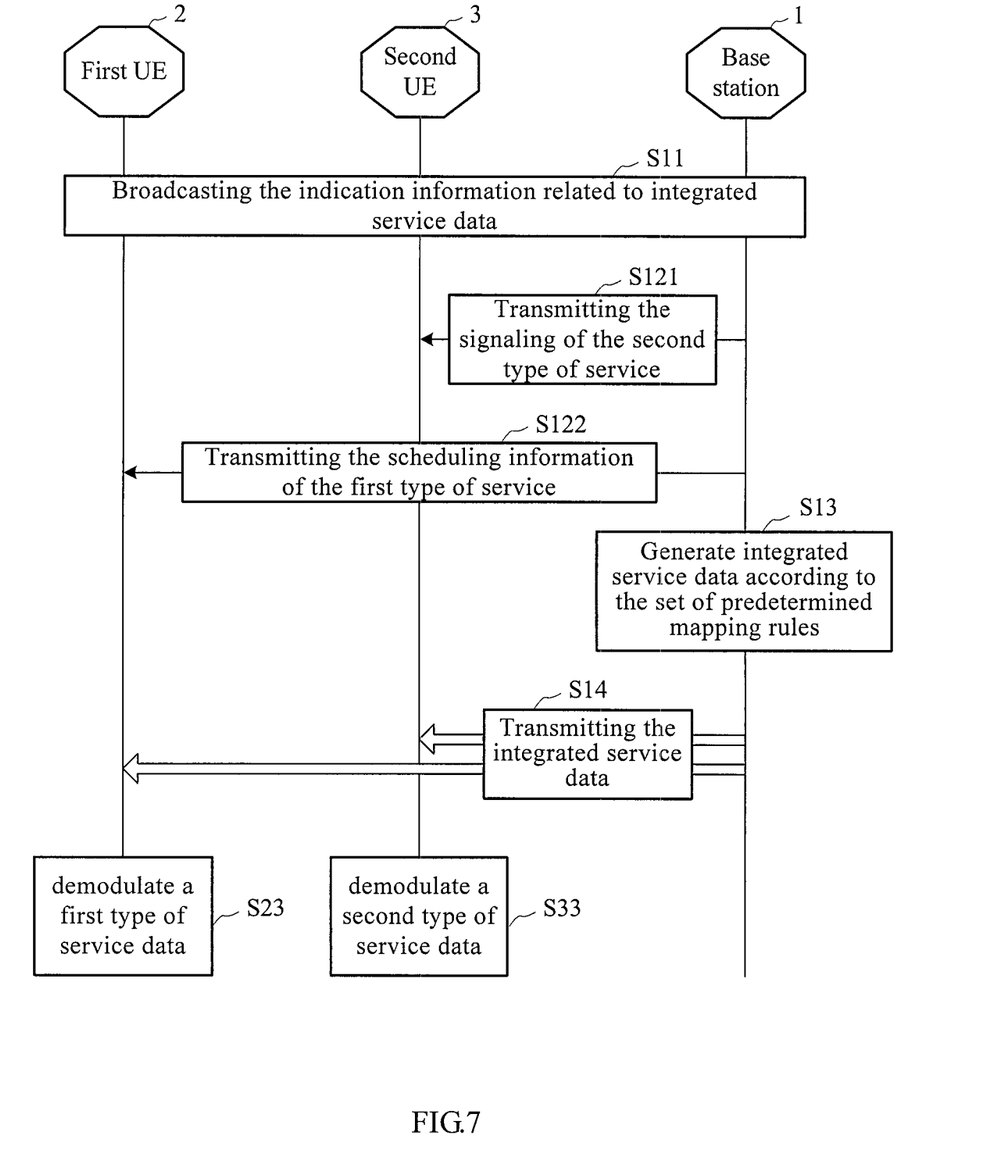
FIG. 7 shows a method flowchart of an integrated multi-datastream transmission in a wireless communication system according to an embodiment of the present invention.

FIG. 7 shows a method flowchart of an integrated multi-datastream transmission in a wireless communication system according to an embodiment of the present invention.

The system includes base station 1, first user equipment 2 and second user equipment 3 as shown.

Base station 1, for example, but not limited to, evolved Node B (eNB), includes generally a transmitter as shown in FIG. 6 for transmitting integrated multi-datastream. There may exist first user equipment(s) 2 to receive a first type of service, for example, but not limited to, unicast service. There may exist multiple second user equipments 3 to receive a second type of service, for example, but not limited to, MBMS. In this embodiment, single cell transmission mode is applied for a second type of service.

Without loss of generality, a first type of service and a second type of service are integrated in a certain time unit and the length of the time unit of the integrated service is defined by the system. Based on the scheduling, base station 1 decides to involve the service(s) of first user equipment(s) 2 in integration with a second type of service. In the time unit, the set of predetermined mapping rules applied for the integration of a first type of service data and a second type of service data corresponds to, for example, but not limited to, the constellation maps shown in FIGS. 5a, 5b, 5c and 5d.

In step S11, base station 1 will broadcast indication information related to an integrated service data, the indication information including when to execute the set of predetermined mapping rules and the applied modulation scheme etc. Wherein, indication information is also used to indicate which first user equipments are involved into the integrated service.

In step S121, base station 1 will transmit the signaling of a second type of service to second user equipment 3.

In step S122, base station 1 will transmit the scheduling information of the first type of service to first user equipment 2.

In step S13, base station 1 will combine a first type of service data and a second type of service data according to a set of predetermined mapping rules, to generate integrated service data. The process includes application of the modulation method as shown in FIG. 4.

In step S14, base station 1 will transmit the integrated service data.

On the side of the first user equipment 2, the following procedures will be executed correspondingly.

In step S21 (not shown), first user equipment 2 will receive the indication information related to an integrated service data and determine whether the integrated service data includes its first type of service data. If the integrated service data includes its first type of service data, first user equipment 2 will continue to execute the following procedures.

In step S22 (not shown), first user equipment 2 will receive the scheduling information of the first type of service.

In step S23, first user equipment 2 will receive the integrated service data according to the indication information related to the integrated service data and the scheduling information of the first type of service, and demodulate its first type of service data therein.

On the side of the second user equipment 3, the following procedures will be executed correspondingly.

In step S31 (not shown), second user equipment 3 will receive the indication information related to an integrated service data and determine whether the integrated service data includes its second type of service data. If the integrated service data includes its second type of service data, second user equipment 3 will continue to execute the following procedures.

In step S32 (not shown), second user equipment 3 will receive the signaling of a second type of service and determine whether to receive the transmitting second type of service. If determined to receive the transmitting second type of service, step S33 will be continued to be executed.

In step S33, second user equipment 3 will receive an integrated service data according to the indication information related to the integrated service data and the scheduling information of a second type of service, and demodulate the second type of service data therein.

According to an embodiment of the present invention, in the cell of the base station 1, interference coordination technology is applied for a first type of service, for example, unicast service. Specifically, the system divides the frequency resource to a number of reuse sets and allocates the user to each reuse set by using power control method; the users located in the center of the cell may transmit and receive by using lower power and are allocated to the reuse set with the reuse factor of 1; the users located in the edge of the cell need to transmit and receive with higher power and are allocated to the reuse set with the reuse factor greater than 1 (for example, 3, 7). The users located respectively in the edge of the neighboring cells are allocated to the different reuse sets. Therefore, before the step S11 as described above, it is necessary for the system to determine, in a certain cell, that the first type of service data of which first user equipments will be combined with a second type of service data to be transmitted together.

Without loss of generality, the method, equipment and device in the present invention may be applied in Long Term Evolution (LTE) system. It is intelligible to those skilled in the art that, the method, equipment and device in the present invention may also be applied to other systems.

Following conditions have been applied to proceed the simulation experiment: In single cell scenario, unicast data and MSMS service data are transmitted in integration by applying the modulation scheme of 16QAM constellation maps as shown in FIGS. 5a and 5c and 16QAM DPC modulation scheme in the prior art, respectively. The link layer simulation result by applying the modulation schemes shown in FIGS. 5a and 5c indicates that link layer simulation performance for the two situations is very close. In the system level simulation experiment, when applying the modulation scheme as shown in FIG. 5a, both MBMS coverage (defined as the percentage of UEs with MBMS packet error rate below 0.01) and effective frequency efficiency are better than the simulation result when applying 16QAM DPC modulation in the prior art. When applying the modulation scheme as shown in FIG. 5a, there are no explicit impacts on the simulation results for different unicast service user equipments selection schemes, for example, random selection or selection of unicast service user equipments with maximum feedback of the channel quality indicator (CQI).

It is intelligible to those skilled in the art that, various equipments in the present invention could be realized by hardware module, by function module in the software and also by hardware module integrated with software function module.

It is intelligible to those skilled in the art that, the embodiments described above are exemplary but not limited. Different technology features appearing in different embodiments can be combined so as to implement beneficial effects. Based on the research of the drawings, specification and claims, it is intelligible to those skilled in the art that, the alternative embodiments of these disclosed embodiments could be implemented. In the claims, term "include" doesn't exclude other equipments or steps; an indefinite article "a" doesn't exclude multiple; terms "first" and "second" are used to indicate name other than any specific order. Any drawings indicator in the claims should not be understood as the limitation to the protection scope. The function of multiple parts appearing in the claims can be implemented by a single hardware or software. Certain technology features appearing in the different subordinate claims don't mean that these technology features cannot be combined so as to acquire beneficial effects.

The invention claimed is:

1. A modulation equipment, comprising:
    a symbol integrator, configured to combine at least one bit from a first bit stream with at least one bit from a second bit stream to form a symbol to be modulated;
    a symbol mapper, configured to map the symbol to be modulated to a constellation of a Quadrature Amplitude Modulation (QAM) map according to a set of predetermined mapping rules;
    wherein, in the set of predetermined mapping rules, multiple constellations corresponding to any particular bit value or particular set of bit values of the first bit stream are located in at least two quadrants in the constellation map and multiple constellations corresponding to any particular bit value or particular set of bit values of the second bit stream are located in at least two quadrants in the constellation map and wherein, in the set of predetermined mapping rules, constellation distribution patterns corresponding to the first bit stream and constellation distribution patterns corresponding to the second bit stream are symmetrical relative to line y=x or line y=−x, wherein, x and y represent the coordinate axis in the complex plane of the constellation map.

2. The modulation equipment according to claim 1, wherein, in the set of predetermined mapping rules, patterns constructed by multiple constellations corresponding to any first bit stream or any second bit stream include rectangle or line.

3. The modulation equipment according to claim 1, wherein, the first bit stream includes unicast service data, the second bit stream includes multimedia broadcast multicast service data.

4. The modulation equipment according to claim 3, wherein, the modulation equipment is disposed in single cell scenario.

5. A modulation method, comprising:
    combining at least one bit from a first bit stream with at least one bit from a second bit stream to form a symbol to be modulated;
    mapping the symbol to be modulated to a constellation of a Quadrature Amplitude Modulation (QAM) map according to a set of predetermined mapping rules;
    wherein, in the set of predetermined mapping rules, multiple constellations corresponding to any particular bit value or particular set of bit values of the first bit stream are located in at least two quadrants in the constellation map and multiple constellations corresponding to any particular bit value or particular set of bit values of the second bit stream are located in at least two quadrants in the constellation map and wherein, in the set of predetermined mapping rules, constellation distribution patterns corresponding to the first bit stream and constellation distribution patterns corresponding to the second bit stream are symmetrical relative to line y=x or line y=−x, wherein, x and y represent the coordinate axis in the complex plane of the constellation map.

6. The modulation method according to claim 5, wherein, in the set of predetermined mapping rules, patterns constructed by multiple constellations corresponding to any first bit stream or any second bit stream include rectangle or line.

7. The modulation method according to claim 5, wherein, the first bit stream includes unicast service data, the second bit stream includes multimedia broadcast multicast service data.

8. The modulation method according to claim 7, wherein, the modulation method is applied in single cell scenario.

9. A transmitter for transmitting integrated multi-datastream signal, comprising:
    a subcarrier mapping equipment, configured to transform first type of service data stream(s) into a first bit stream corresponding to each subcarrier;
    a Serial/Parallel converter, configured to transform a second type of service data stream into a second bit stream corresponding to each subcarrier;
    a modulation equipment, configured to combine at least one bit from the first bit stream and at least one bit from the second bit stream corresponding to each subcarrier to form a symbol to be modulated, and to map the symbol to be modulated to a constellation of a Quadrature Amplitude Modulation (QAM) map according to a set of predetermined mapping rules wherein, in the set of predetermined mapping rules, constellation distribution patterns corresponding to the first bit stream and constellation distribution patterns corresponding to the second bit stream are symmetrical relative to line y=x or line y=−x, wherein, x and y represent the coordinate axis in the complex plane of the constellation map;
    a signal forming equipment, configured to generate Orthogonal Frequency Division Multiplexing (OFDM) signal according to the QAM symbol in each subcarrier.

10. The transmitter according to claim 9, wherein, the first type of service data includes unicast service data, the second type of service data includes multimedia broadcast multicast service data.

11. A method of transmitting integrated multiple service data in a base station in a wireless communication system, comprising:
    broadcasting indication information related to an integrated service data, wherein the indication information includes a set of predetermined mapping rules and the integrated service data includes a first type of service data and a second type of service data;
    transmitting scheduling information of the first type of service and signaling of the second type of service;
    combining a first type of service data and a second type of service data according to the set of predetermined mapping rules, to generate integrated service data, wherein, in the set of predetermined mapping rules, constellation distribution patterns corresponding to a first bit stream of the first type of service data and constellation distribution patterns corresponding to a second bit stream of the second type of service data are symmetrical relative to line y=x or line y=−x, wherein, x and y represent the coordinate axis in the complex plane of a constellation map;
    transmitting the integrated service data.

12. The method according to claim 11, wherein, the first type of service data includes unicast service data, the second type of service data includes multimedia broadcast multicast service data.

* * * * *